(12) United States Patent
Kinnari et al.

(10) Patent No.: US 8,220,552 B2
(45) Date of Patent: Jul. 17, 2012

(54) METHOD OF INHIBITING HYDRATE FORMATION

(75) Inventors: Keijo J. Kinnari, Stavanger (NO);
Catherine Labes-Carrier, Stavanger (NO); Knud Lunde, Stavanger (NO);
Leif Aaberge, Stavanger (NO)

(73) Assignee: Statoil ASA, Stavanger (NO)

( * ) Notice: Subject to any disclaimer, the term of this patent is extended or adjusted under 35 U.S.C. 154(b) by 0 days.

(21) Appl. No.: 11/661,836

(22) PCT Filed: Sep. 9, 2005

(86) PCT No.: PCT/GB2005/003494
§ 371 (c)(1), (2), (4) Date: Sep. 24, 2007

(87) PCT Pub. No.: WO2006/027609
PCT Pub. Date: Mar. 16, 2006

(65) Prior Publication Data
US 2008/0053659 A1    Mar. 6, 2008

(30) Foreign Application Priority Data
Sep. 9, 2004 (GB) .................................. 0420061.4

(51) Int. Cl.
*E21B 17/01* (2006.01)
*E21B 43/16* (2006.01)

(52) U.S. Cl. ......... 166/367; 166/344; 166/401; 166/402

(58) Field of Classification Search ............... 166/272.2, 166/272.6, 401, 402, 344, 270, 367; 137/155
See application file for complete search history.

(56) References Cited

U.S. PATENT DOCUMENTS

| | | | | | |
|---|---|---|---|---|---|
| 2,217,749 | A | * | 10/1940 | Hewitt | 166/266 |
| 2,658,460 | A | * | 11/1953 | Davis | 417/113 |
| 3,514,274 | A | * | 5/1970 | Johnston et al. | 585/15 |
| 3,528,218 | A | * | 9/1970 | McDonald, Jr. et al. | 95/106 |
| 4,007,787 | A | * | 2/1977 | Cottle | 166/267 |
| 4,042,033 | A | | 8/1977 | Holland et al. | |
| 4,399,868 | A | * | 8/1983 | Richardson et al. | 166/300 |
| 4,456,067 | A | * | 6/1984 | Pinner, Jr. | 166/279 |
| 4,625,803 | A | * | 12/1986 | Walhaug et al. | 166/310 |
| 4,856,593 | A | * | 8/1989 | Matthews et al. | 166/310 |
| 5,076,364 | A | * | 12/1991 | Hale et al. | 166/310 |

(Continued)

FOREIGN PATENT DOCUMENTS

EA    200802280    9/2005

(Continued)

OTHER PUBLICATIONS

Davalath et al , "Bijupira Salema: Flow Assurance Analysis to Support Operation Strategy" OTC 16692, May 2004.*

(Continued)

*Primary Examiner* — Thomas Beach
*Assistant Examiner* — Matthew Buck
(74) *Attorney, Agent, or Firm* — Ballard Spahr LLP

(57) ABSTRACT

The present invention provides a method of inhibiting formation of solid hydrates in a conduit used to contain a flowing, water-containing hydrocarbon, which method comprises introducing into said hydrocarbon in said conduit a gas which raises the pressure threshold for hydrate formation for said water-containing hydrocarbon, said gas being introduced in a manner which causes it to travel along at least part of said conduit in the direction of hydrocarbon flow.

7 Claims, 2 Drawing Sheets

U.S. PATENT DOCUMENTS

Figure 1:
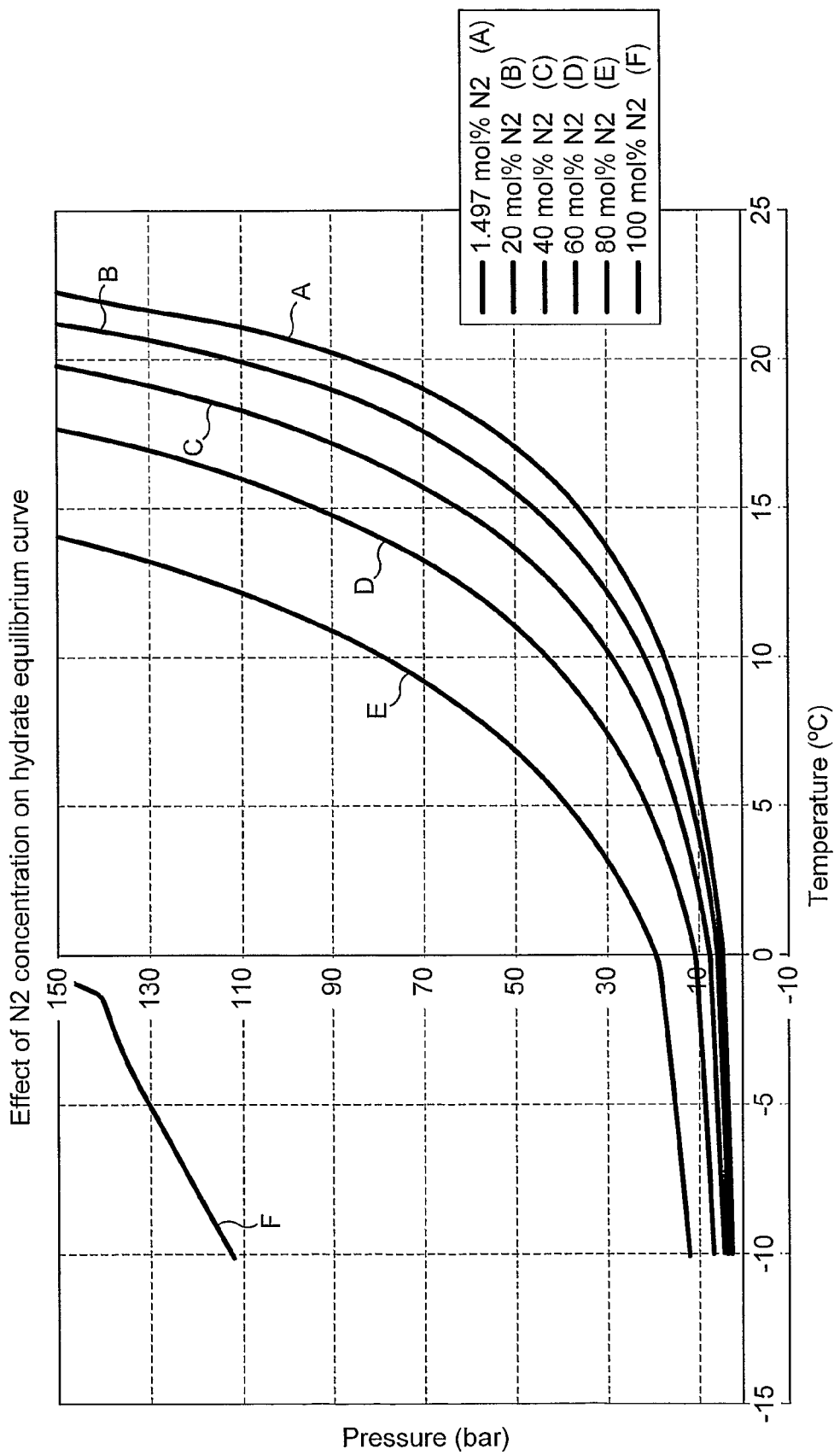

| | | | |
|---|---|---|---|
| 5,168,933 A | | 12/1992 | Pritchard, Jr. et al. |
| 5,351,756 A * | | 10/1994 | Minkkinen et al. ............ 166/267 |
| 5,536,893 A * | | 7/1996 | Gudmundsson ................ 585/15 |
| 5,600,044 A * | | 2/1997 | Colle et al. ....................... 585/15 |
| 5,639,313 A * | | 6/1997 | Khalil ............................. 134/18 |
| 5,762,149 A * | | 6/1998 | Donovan et al. ................ 175/40 |
| 5,824,160 A * | | 10/1998 | Khalil et al. ....................... 134/5 |
| 5,879,561 A * | | 3/1999 | Klomp et al. .................. 210/698 |
| 5,891,262 A * | | 4/1999 | Khalil et al. ............... 134/22.11 |
| 6,035,933 A * | | 3/2000 | Khalil et al. .................. 166/263 |
| 6,076,278 A | | 6/2000 | Bradley |
| 6,253,855 B1 * | | 7/2001 | Johal et al. .................... 166/367 |
| 6,307,191 B1 * | | 10/2001 | Waycuilis ..................... 219/687 |
| 6,694,768 B2 * | | 2/2004 | Lu .................................. 62/317 |
| 6,772,840 B2 * | | 8/2004 | Headworth ................... 166/302 |
| 6,776,188 B1 * | | 8/2004 | Rajewski ................. 137/624.13 |
| 6,978,837 B2 * | | 12/2005 | Yemington ................... 166/303 |
| 7,008,466 B2 * | | 3/2006 | Collins ............................ 95/153 |
| 7,264,653 B2 * | | 9/2007 | Panchalingam et al. ......... 95/153 |
| 2003/0170077 A1 * | | 9/2003 | Herd et al. ................. 405/224.2 |
| 2003/0178195 A1 | | 9/2003 | Agee et al. |
| 2005/0072574 A1 * | | 4/2005 | Appleford et al. ............ 166/366 |
| 2006/0115332 A1 * | | 6/2006 | Abney et al. .................. 405/169 |
| 2009/0111715 A1 | | 4/2009 | Ballard et al. |

FOREIGN PATENT DOCUMENTS

| | | |
|---|---|---|
| EP | 0909873 A2 | 4/1999 |
| EP | 0923998 A2 | 6/1999 |
| GB | 0605323.5 | 3/2006 |
| RU | 2 264 530 | 11/2005 |
| SU | 648795 A | 2/1979 |
| SU | 1350477 A1 | 11/1987 |
| SU | 1456204 A1 | 2/1989 |
| WO | WO00/17484 | 3/2000 |
| WO | WO-2005/042675 A2 | 5/2005 |
| WO | PCT/GB2007/000897 | 3/2007 |

OTHER PUBLICATIONS

U.S. Appl. No. 12/224,935, filed Feb. 27, 2009, K. Kinnari.

Eurasian Patent Office Search Report issued on Jun. 15, 2009 for EA Pat. App. No. 200802280, which is a national phase of Intl. App. No. PCT/GB2005/003494, filed on Sep. 9, 2005 (First Inventor—Kinnari; Applicant—Statoil ASA; pp. 1-2).

International Preliminary Report on Patentability issued on Mar. 13, 2007 for Intl. App. No. PCT/GB2005/003494, filed on Sep. 9, 2005 (First Inventor—Kinnari; Applicant—Statoil ASA; pp. 1-6).

International Preliminary Report on Patentability issued on Sep. 16, 2008 for Intl. App. No. PCT/GB2007/000897, filed on Mar. 14, 2007 (First Inventor—Kinnari; Applicant—Statoil ASA; pp. 1-6).

International Search Report and Written Opinion issued on Nov. 18, 2005 for Intl. App. No. PCT/GB2005/003494, filed on Sep. 9, 2005 (First Inventor—Kinnari; Applicant—Statoil ASA; pp. 1-7).

International Search Report and Written Opinion issued on Jul. 3, 2007 for Intl. App. No. PCT/GB2007/000897, filed on Mar. 14, 2007 (First Inventor—Kinnari; Applicant—Statoil ASA; pp. 1-10).

Kostin, A.I. et al., " Memrannoe vozduho-gazorazdelenie v neftyanoi promyshlennosti," Territoriya Neftegaz, 2005, vol. 12., pp. 1-5.

Kostin, A.I. et al., "Membrannye azotyne ustanovki v refte-gazovoi promyshlennosti," Sfera Neftegaz, 2006, Special Issue No. 1., pp. 1 (translation—pp. 2-4).

Notification (Official Action from Eurasian Patent Office) issued on Oct. 31, 2007 for EA Pat. App. No. 200700430, which is a national phase of Intl. App. No. PCT/GB2005/003494, filed on Sep 9, 2005 (First Inventor—Kinnari; Applicant—Statoil ASA; pp. 1-2).

Search Report under Section 17 issued on Jul. 13, 2006 for UK Pat. App. No. GB0605323.5, filed Mar. 16, 2006 (First Inventor—Kinnari; Applicant—Statoil ASA; pp. 1-3).

Response after Non-Final Office Action filed by Applicant on Dec. 29, 2011 for U.S. Appl. No. 12/224,935, filed on Feb. 27, 2009 (First Inventor—Kinnari; pp. 1-4).

Non-Final Office Action issued by USPTO on Oct. 20, 2011 for U.S. Appl. No. 12/224,935, filed on Feb. 27, 2009 (First Inventor—Kinnari; pp. 1-5).

Amendment Submitted with CPA/RCE filed by Applicant on Sep. 26, 2010 for U.S. Appl. No. 12/224,935, filed on Feb. 27, 2009 (First Inventor—Kinnari; pp. 1-5).

Final Office Action issued by USPTO on Apr. 26, 2011 for U.S. Appl. No. 12/224,935, filed on Feb. 27, 2009 (First Inventor—Kinnari; pp. 1-7).

Response after Non-Final Office Action filed by Applicant on Feb. 14, 2011 for U.S. Appl. No. 12/224,935, filed on Feb. 27, 2009 (First Inventor—Kinnari; pp. 1-9).

Non-Final Office Action issued by USPTO on Oct. 13, 2010 for U.S. Appl. No. 12/224,935, filed on Feb. 27, 2009 (First Inventor—Kinnari; pp. 1-7).

Preliminary Amendment filed by Applicant on Sep. 8, 2008 for U.S. Appl. No. 12/224,935, filed on Feb. 27, 2009 (First Inventor—Kinnari; pp. 1-6).

Notice of Allowance issued on Feb. 8, 2012 for U.S. Appl. No. 12/224,935, filed on Feb. 27, 2009 (First Inventor—Kinnari).

* cited by examiner

METHOD OF INHIBITING HYDRATE FORMATION

The present application claims priority to Great Britain Patent Application No. 0420061.4 filed 9 Sep. 2004, which application is incorporated herein fully by this reference.

The present invention relates to improvements in and relating to methods for combating gas hydrate formation in hydrocarbon conduits, in particular conduits in sub-sea production systems, and to apparatus therefor.

The well stream from a hydrocarbon reservoir contains water in gaseous or liquid form. At high pressures and low temperatures water can form solid materials in which low molecular weight hydrocarbons, i.e. hydrocarbons which are gaseous at standard temperatures and pressures (STP), are caged. One cubic meter of such a solid can entrap about 180 cubic meters (at STP) of gas. Such materials are normally referred to as "gas hydrates" or simply "hydrates" and will be referred to hereinafter as "hydrates".

For a sub-sea production system, the ambient temperature of the sea water surrounding the conduit (i.e. "pipeline" or "flow line") from the well head to the water surface, at its lowest is generally about 4° C. At this temperature, hydrates typically form at pressures of about 10 bar. Since the hydrocarbon flow through the conduit will routinely be at a pressure many multiples of this, hydrate formation, which can plug the conduit is a major risk. The temperatures at which hydrate formation occurs may be reached if hydrocarbon flow is reduced or stopped causing the hydrocarbon to cool below the temperature at which hydrate formation occurs, or if the flow path is so long that such cooling will inevitably occur.

If a sub-sea conduit becomes blocked through hydrate plugging, not only does hydrocarbon production cease but unblocking is highly problematical. As mentioned above one cubic meter of hydrate entraps about 180 STP cubic meters of gas—thus simply heating the blocked section of the conduit can cause a pressure surge which may be dangerous or damaging. Due to the serious consequences of a blockage it is common practice to protect the fluid in long (e.g. 40 or more km) sub-sea conduits against hydrate formation by continuous injection at the well head of hydrate inhibitors such as methanol or monoethylene glycol, or to introduce such inhibitors if an unexpected shutdown occurs in shorter conduits, whenever this is possible.

However, not only are such inhibitors expensive but they also reduce the sale price by contaminating the produced hydrocarbon.

Where the hydrocarbon is produced sub-sea through a tall vertically extending (e.g. 500 m and above) rigid riser or through a flexible riser (in the bends of which liquid can pool), the problem of hydrate formation can be particularly severe.

While hydrate formation is particularly problematic in sub-sea production systems, it is of course equally problematic for surface pipelines/flowlines in areas which experience ambient temperature which are below the hydrate formation temperature.

Along the conduit from well-head to sea surface, the insulation efficiency will generally vary. The insulation efficiency is generally expressed as the heat transfer co-efficient U with insulation efficiency being smaller at larger values of U. Typically the U values for jumpers or spools (components of the conduit) may be two or more times greater than the U values for the flowlines (again, components of the conduit). As a result, if flow stops heat loss at the jumpers and spools is greater than at the flowlines and thus the hydrate domain is reached more rapidly so increasing the risk of hydrate formation in these components.

When the production is closed down (whether planned or unplanned) it is therefore important to avoid entering the hydrate domain (i.e. the set of conditions where hydrate formation would occur). One general method of doing this is to reduce the pressure in the conduit so as to avoid the temperature and pressure conditions at any stage of the conduit becoming conducive to hydrate formation. Alternatively, a hydrate inhibitor such as ethylene glycol may be introduced into the flow. Restarting the flow must likewise be carried out carefully so as to avoid creating temperature and pressure conditions conducive to hydrate formation. A further option for avoiding entering the hydrate domain is to maintain the temperature by applying heat to the conduit—this however requires appropriate heating systems to be in place.

Thus there exists a continuing need for improved methods by which hydrate formation, e.g. plug formation, in hydrocarbon conduits may be prevented.

We have now found that by introducing into the hydrocarbon flow a gas (i.e. a material which is gaseous at STP) which raises the pressure threshold (or reduces the temperature threshold) for hydrate formation, the risk of hydrate formation may be reduced and the time period during which preventative action may successfully be taken can be extended or the need for additional preventative action may be avoided.

Thus viewed from one aspect the invention provides a method of inhibiting formation of solid hydrates in a conduit used to contain a flowing, water-containing hydrocarbon, which method comprises introducing into said conduit a gas which raises the pressure threshold for hydrate-formation (e.g. at the ambient temperature of the surroundings of the conduit, for example at 4° C.) for said water-containing hydrocarbon, said gas being introduced in a manner which causes it to travel along at least part of said conduit in the direction of hydrocarbon flow.

Typically the gas (the "inhibitor gas") will be introduced into the hydrocarbon in the conduit; however if desired it may be introduced into the conduit during shut-in conditions.

The method of the invention is primarily for preventing solid hydrates from forming and is thus preferably effected before conduit blockage (plug formation) by hydrates occurs.

In the method of the invention, the direction of hydrocarbon flow is the direction in which the hydrocarbon flows in normal operation.

The gas used as a hydrate inhibitor in the method of the invention may be any gas capable of raising the pressure threshold for hydrate formation, i.e. for the hydrocarbon being transported along the conduit it moves the phase boundary between the hydrate and the hydrocarbon and water phases in the phase diagram in the direction of increased pressure at a given temperature, here for the sake of clarity defined as being 4° C. Gases capable of achieving this effect include carbon dioxide, nitrogen and the group O gases (e.g. helium, neon, argon, etc.). However for reasons of efficacy, safety, and cost the use of nitrogen is most preferred. The gas used may be introduced as a single substance or in a mixture of substances, e.g. a mixture of two or more gases having the desired effect (for example nitrogen and helium) or a mixture which has the desired effect but containing one or more gases (e.g. hydrocarbons) which on their own do not have the desired effect.

The use of carbon monoxide or oxygen as the gas is not generally desirable for safety reasons.

Whichever gas is used, the form in which it is introduced preferably contains less than 10% mole oxygen, especially preferably less than 5% mole, more particularly less than 2% mole. Similar limits apply for carbon monoxide.

The use of a gas to inhibit hydrate formation in this way is counter-intuitive since the gas used will itself be capable of forming hydrates.

The gas is introduced in a quantity sufficient to inhibit hydrate formation under the pressure and temperature conditions in the conduit—the pressure within the conduit and the rate of fluid flow within the conduit will of course determine whether or not hydrate formation is inhibited and the pressure and flow rate should thus be monitored and adjusted to ensure hydrate formation does not occur. Typically the gas will be added in quantities such that up to 100% mole of the fluid within the conduit immediately downstream of the gas injection site is the inhibitor gas. Desirably the figure will be at least 25% mole, more preferably at least 40% mole, especially at least 60% mole, more especially at least 80% mole, e.g. up to 99% mole, more preferably up to 95% mole. In view of the large volumes of gas used, it is of course desirable for economic reasons to use nitrogen.

It is nevertheless desirable that that portion of the fluid flow that contains the gas should be combustible and accordingly the quantity added may be kept to a level which permits this or alternatively hydrocarbon (e.g. methane, natural gas, etc.) may be added to the fluid flow downstream of inhibitor gas introduction to bring down the relative concentration of inhibitor gas. Such hydrocarbon introduction should of course take place at a point where there is no risk of hydrate formation, or after restarting flow after a depressurization.

The method of the invention is especially suitable for use with sub-sea wells, in particular for preventing hydrate formation in one or more of the components in the conduit from well-head to above the water surface, especially jumpers (connections from well-head to manifold or template), manifold, template, spools (expandable joints within the conduit), flowlines and both flexible and rigid risers. It may also be used within the sections of the well where the ambient temperature of the surrounding formation is low enough to permit hydrate formation (e.g. down to about 100 m below the mudline) and in above-surface sections of a conduit.

The method of the invention may also advantageously be used in the annulus section of the well design. Normally, the annulus pressure is controlled by using methanol or glycol. Use of an inhibitor gas as described herein (e.g. nitrogen), will provide an alternative solution. Any leakage of the well stream into the annulus bleed line would thus be inhibited by the inhibitor gas. Another advantage with using the inhibitor gas is that it will accommodate in a more effective way for thermal volume expansions than would a liquid filled annulus bleed line.

The method of the invention may be used at different stages of well operation; however it is particularly advantageous to use it before, during and after a flow reduction or shut-down.

In the case of an unplanned shut-down, the inhibitor gas is preferably introduced at one or more sites along the conduit, especially preferably sites upstream of one or more of jumpers, templates, manifolds, spools or risers, before, during or after depressurization. Introduction of the inhibitor gas in this way serves to extend the cool down time for sections of the conduit with high U values, i.e. sections particularly at risk of hydrate formation. Cool down time (CDT) is one of the key design factors and is the time a given structure will take to reach hydrate-forming conditions from production conditions. CDT requirements vary from field to field but usually are more stringent for deep-water than shallow-water applications. The addition of the inhibitor gas reduces the hydrate equilibrium temperature, automatically prolonging CDT and allowing more time for implementation of hydrate control measures. With the use of the method of the invention in this way, it is alternatively possible to reduce the insulation requirements for the components of the conduit and hence to reduce their cost.

During a planned or unplanned shut-down, introduction of the inhibitor gas may also be used to reduce the need to depressurize the initially hydrate-free areas of the conduit. Thus for example for typical operating conditions where the flowing hydrocarbon has a temperature of 18° C. and the ambient seawater temperature is 4 to 5° C. shut down would involve depressurizing from 200 bar to about 10 bar. If nitrogen is added to a concentration of about 60% mole, depressurization to about 20 bar will suffice while for nitrogen addition to a concentration of about 90% mole depressurization to about 50 bar may suffice.

Inhibitor gas introduction may be affected relatively simply by providing a valve line from an inhibitor gas source to the desired introduction sites on the conduit or within the bore. Such lines are desirably thermally insulated and it may be desirable to heat the inhibitor gas before injection, e.g. on transit to the injection site. Inhibitor gas may typically be introduced from a nitrogen generator or nitrogen reservoir (e.g. a liquid or pressurized nitrogen tank). Introduction may be operator controlled; however automatic introduction, i.e. computer-controlled in response to signals from flow monitors, will generally be desirable.

In certain operating modes, it will be desirable to reduce or stop hydrocarbon flow upstream of the inhibitor gas injection sites so as to increase the relative concentration of the inhibitor gas in the conduit downstream of the injection sites.

The inhibitor gas will generally be introduced under normal shut-in pressure, e.g. up to 300 bar for example 10 to 250 bar. The inhibitor gas may alternatively be introduced into a partially or totally depressurized conduit, in which case a lower introduction pressure may suffice. In any event, the line from gas source to conduit introduction point will generally be provided with pumps and/or compressors.

Where the inhibitor gas is used during depressurization, the quantity added and the rate at which it is added should be matched to the depressurization profile and the insulation characteristics of the conduit so as to ensure that the pressure and temperature conditions do not become conducive to hydrate formation. Likewise during repressurization it will generally be desirable to add inhibitor gas and similarly match the quantity added to the repressurization profile. In many cases it may be desirable to flush the conduit (e.g. from the well-head or other selected sites) with the inhibitor gas before hydrocarbon flow is restarted. Moreover it may be desirable to add a chemical inhibitor (e.g. glycol) to the hydrocarbon during repressurization.

One particular region of the conduit in which use of the method of the invention is especially favourable is in risers where gas lift is required.

Gas lift is used to drive liquid up tall deepwater risers. When depressurized, the residual fluid in such risers may create a pressure which is far above that at which, under ambient temperature conditions, hydrate formation occurs at the base of the riser. In normal operation, gas (generally natural gas) is injected into the hydrocarbon flow at or near the riser base to drive the liquid up and out of the riser. In the method of the invention, before, during or after depressurization the gas lift gas may be switched to being inhibitor gas so as to minimize the possibility of the riser retaining sufficient liquid as to cause hydrate formation when depressurization is completed. Before and during repressurization the riser may likewise be flushed with inhibitor gas. Particularly preferably inhibitor gas flow in the riser is maintained during shutdown. This use of the method of the invention is particularly useful with risers having a vertical length of 100 m or more, especially 250 m or more, more especially 500 m or more.

In a further aspect of the invention, the inhibitor gas may be injected into the conduit against the direction of hydrocarbon flow in normal operation. This technique, which would generally be considered to be "bullheading", is especially applicable for use with risers, especially ones with a large vertical extend, e.g. above 250 m, especially above 500 m; however it may be used to force the hydrocarbon content of the conduit further back, even to the extent of forcing hydrocarbon back down the well bore, e.g. to a depth at which the temperature of the formation is such that hydrate formation does not occur. This may be achieved by bull-heading with the inhibitor gas from the surface or may be achieved by inhibitor gas injection upstream of one or more of the valves in the conduit, optionally before, during or after closing such valves. In this way the nature of the conduit contents may be altered so as to minimize the chances of hydrate formation. To do this however the injection pressure of the inhibitor gas will generally need to be higher than that used for the earlier aspect of the method of the invention.

Viewed from this further aspect the invention thus provides a method of inhibiting hydrate formation in a hydrocarbon conduit which method comprises injecting an inhibitor gas into said conduit at a pressure higher than that of the hydrocarbon therein whereby to reverse the direction of fluid flow within said conduit.

Once again, the method is preferably one applied before plug formation and more preferably before hydrate formation occurs in the conduit so as to prevent hydrate formation from occurring or so as to reduce the extent of hydrate formation, especially so as to avoid plug formation.

The invention also provides apparatus for operation of the method of the invention. Viewed from this aspect the invention provides a hydrocarbon transfer apparatus comprising a conduit for hydrocarbon flow having a hydrocarbon inlet valve and a hydrocarbon outlet valve, an inhibitor gas source, and a valved line from said source to an inlet port within said conduit, said line optionally being provided with a pump.

The components of the apparatus of the invention may include any of the components encountered in the hydrocarbon conduit from a hydrocarbon well-bore to above the water surface.

Particularly desirably the hydrocarbon conduit will be provided with inhibitor gas inlets, valves and vents at a plurality of positions along its length so that the section of the conduit to be treated with the method of the invention may be selected as desired, i.e. so that a limited volume of the conduit may be treated if desired.

The invention will now be illustrated with reference to the accompanying drawings in which:

FIG. 1 is a plot of a phase diagram for hydrate and gas (or hydrocarbon)/water at various levels of nitrogen content (the lines are respectively the hydrate equilibrium curves at (1) 100% mole nitrogen; (2) 95% mole nitrogen; (3) 90% mole nitrogen; (4) 80 mole nitrogen (5) 60 mole nitrogen; (6) 40 mole nitrogen; (7) 20 mole nitrogen; and 1.5% mole nitrogen); and FIG. 2 is a schematic diagram of a sub-surface hydrocarbon well equipped to perform the method of the invention.

Referring to FIG. 1 it may be seen that by increasing the nitrogen content of a hydrocarbon flow to 80% mole (for example), the hydrate equilibrium pressure at 4° C. is increased from about 4 bar to about 30 bar (for the hydrocarbon mixture used).

Figure 2:
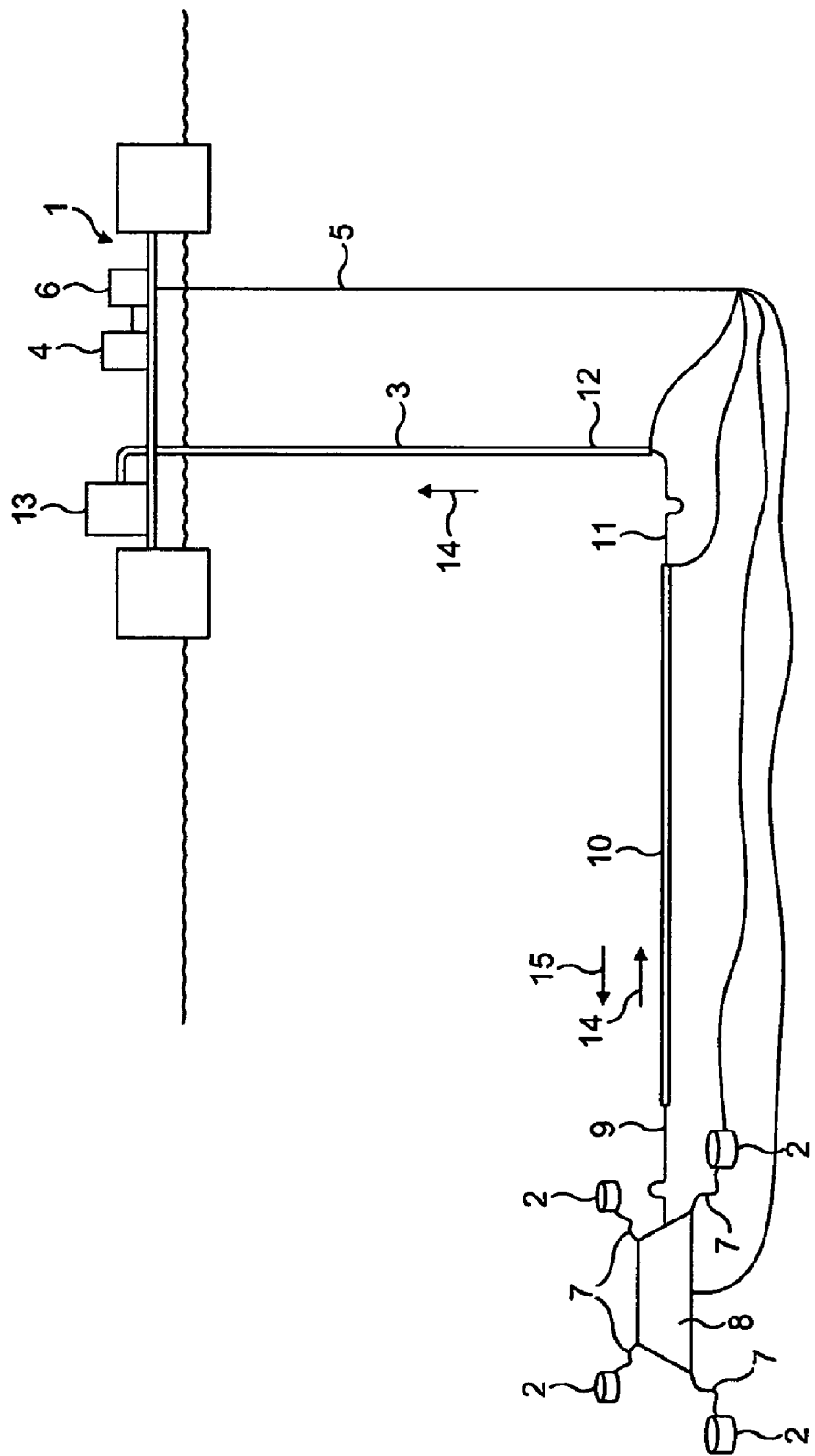

Referring to FIG. 2 there is shown a sea level platform 1 linked to sea bed well-heads 2 via a conduit 3. Platform 1 is provided with a nitrogen generator 4 and a nitrogen line 5 equipped with pump 6 and valves (not shown). The well-heads 2 are connected by jumpers 7 to a template 8. Template 8 is connected via a spool 9 to flowline 10. Arrows denote the direction of hydrocarbon flow 14 and reverse flow 15. Flowline 10 is connected via a spool 11 to a rigid riser 12. Hydrocarbon flowing from rigid riser 12 is fed to a reservoir 13 at the surface.

Before, during or after depressurization or before or during repressurization, nitrogen from generator 4 may be injected into conduit 3 upstream of jumpers 7 and spools 9 or 10, or as a gas lift gas into the base of riser 12.

The invention claimed is:

1. A method of inhibiting formation of solid hydrates in a conduit used to contain a flowing, water-containing hydrocarbon, which method comprises introducing into said hydrocarbon in said conduit, either before formation of hydrates or before formation of a plug, a gas selected from carbon dioxide, nitrogen, a group 0 gas, or a combination thereof, which raises the pressure threshold for hydrate formation for said water-containing hydrocarbon, said gas being introduced in a manner which causes it to travel along at least part of said conduit in the direction of hydrocarbon flow, wherein at least 80 mole % of the fluid within the conduit immediately downstream of the gas injection site is the gas, thereby inhibiting formation of solid hydrates.

2. A method according to claim 1 wherein said gas is added in quantities such that up to 100% mole of the fluid within the conduit immediately downstream of the gas injection site is the inhibitor gas.

3. A method according to claim 1 wherein solid hydrate formation is inhibited before a flow reduction or shutdown, during a flow reduction or shutdown, after a flow reduction or shutdown, or at any combination thereof.

4. A method according to claim 1 wherein said gas is introduced at a pressure of up to 300 bar ($3\times10^7$ Pa).

5. A method according to claim 1 wherein solid hydrate formation is inhibited in at least one of the components in the conduit from a well-head to above a water surface selected from the group consisting of jumpers, manifolds, templates, spools, flowlines, flexible risers and rigid risers.

6. A method according to claim 1 wherein said gas is nitrogen.

7. A method according to claim 1 wherein said gas contains less than 2% mole oxygen.

* * * * *